L. C. VAN PATTEN AND J. B. WOLFE.
ROTARY ROD WEEDER.
APPLICATION FILED MAY 8, 1920. RENEWED JUNE 21, 1921.
1,393,055.
Patented Oct. 11, 1921.
3 SHEETS—SHEET 1.
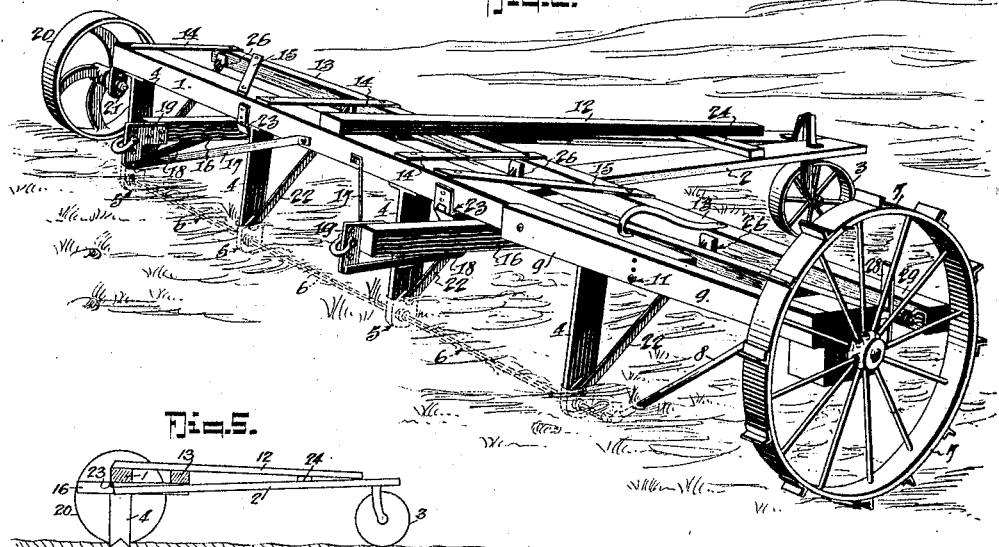
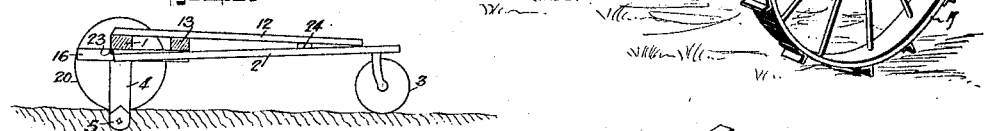
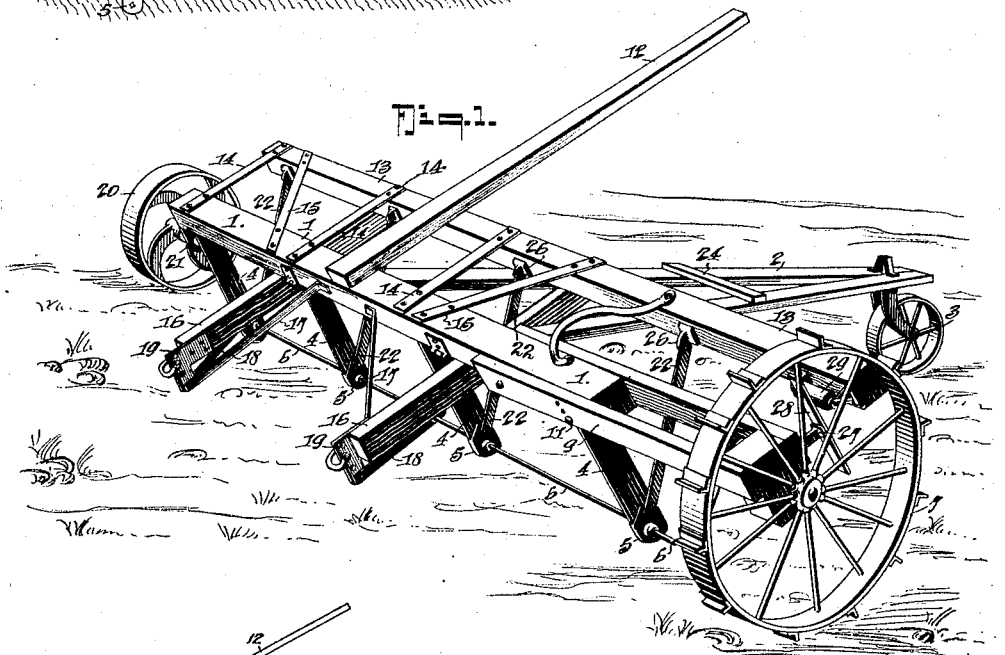
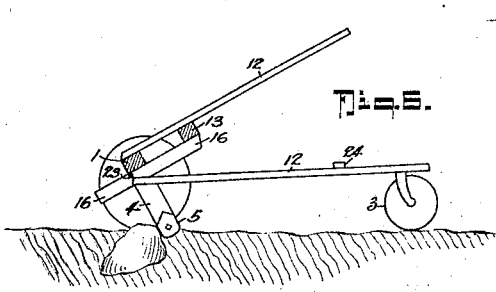
INVENTOR
Louis C. Van Patten.
Joel B. Wolfe.
BY
Fred G. Diederich & Co
ATTORNEYS L. C. VAN PATTEN AND J. B. WOLFE.
ROTARY ROD WEEDER.
APPLICATION FILED MAY 8, 1920. RENEWED JUNE 21, 1921.
1,393,055.
Patented Oct. 11, 1921.
3 SHEETS—SHEET 2.
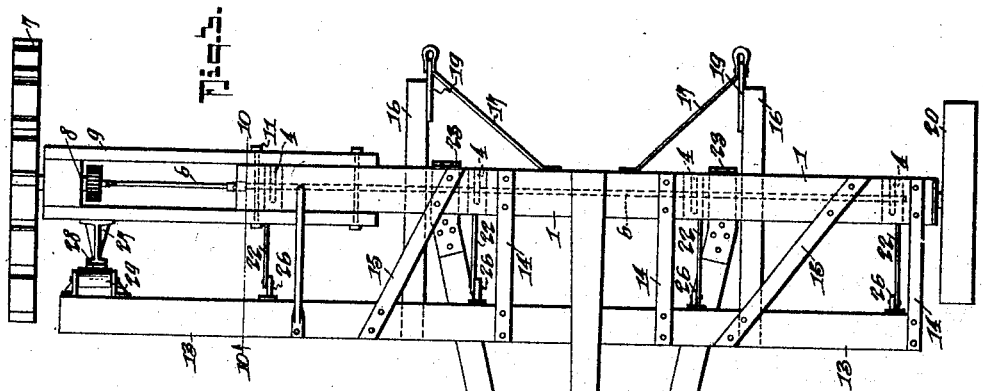
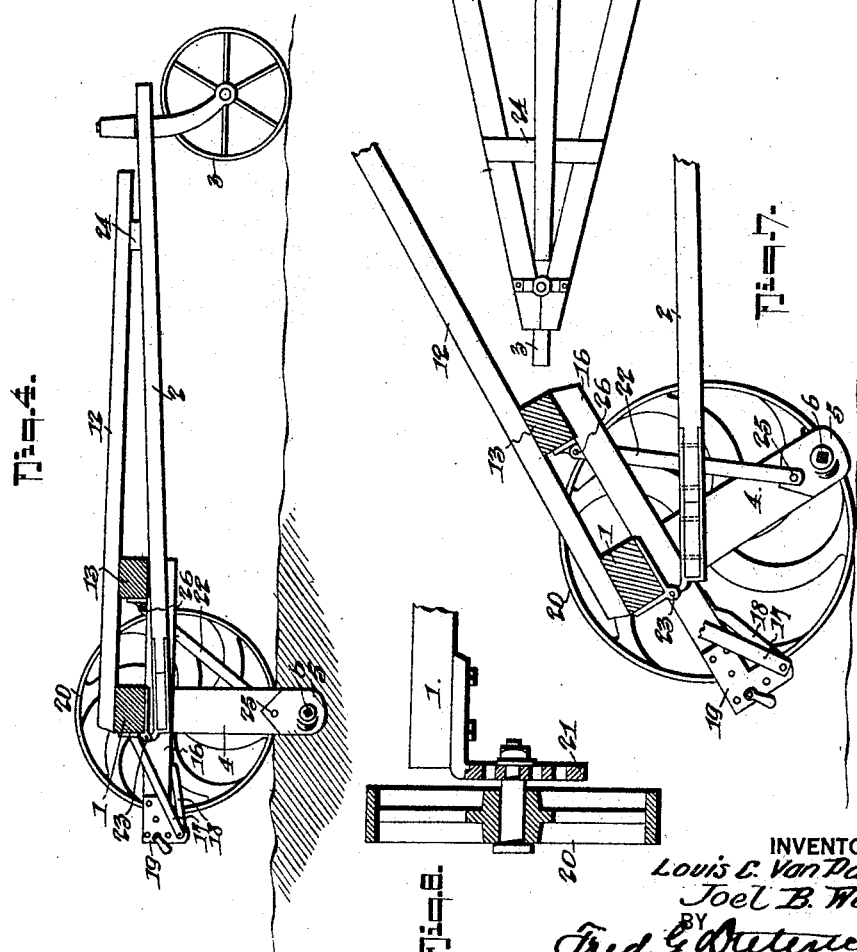
INVENTOR
Louis C. Van Patten.
Joel B. Wolfe.
BY
Fred G. Dieterich &Co
ATTORNEYS

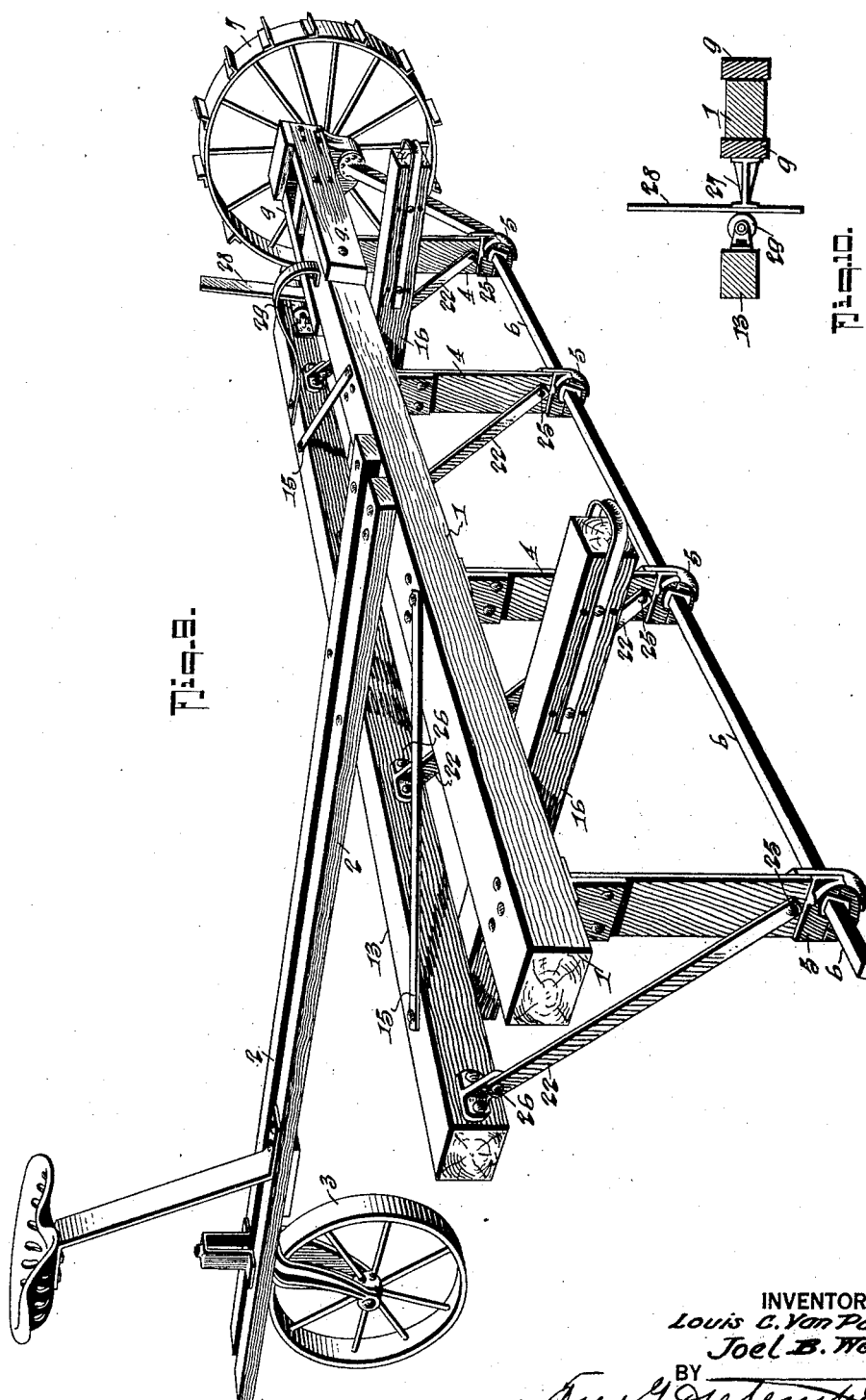

UNITED STATES PATENT OFFICE.

LOUIS C. VAN PATTEN AND JOEL B. WOLFE, OF CHENEY, WASHINGTON, ASSIGNORS TO ROTARY ROD WEEDER AND MANUFACTURING COMPANY, INCORPORATED, OF CHENEY, WASHINGTON.

ROTARY-ROD WEEDER.

1,393,055.          Specification of Letters Patent.      Patented Oct. 11, 1921.

Application filed May 8, 1920. Serial No. 379,859. Renewed June 21, 1921. Serial No. 479,312.

*To all whom it may concern:*

Be it known that we, Louis C. Van Patten and Joel B. Wolfe, citizens of the United States, residing at Cheney, in the county of Spokane and State of Washington, have invented certain new and useful Improvements in Rotary-Rod Weeders, of which the following is a specification.

Our invention relates to certain new and useful improvements in weeders of the rotary rod type such as disclosed, for example, in the patent to G. H. Wolfe, #1,232,149, granted July 3, 1917. The weeders of the type disclosed in the Wolfe patent while operating very successfully under ordinary conditions have been found not to entirely meet the requirements of practice when the weeder is to be used in operating upon big weeds. In the former machine, it will be noticed by reference to the patent aforesaid, the hitch bar was placed in front of the machine and connected to the iron standards with links or chain. This connection with the iron standards sometimes caused the machine to clog in big weeds, due to the fact that the hitch links held the weeds from working up on the iron standards and pressed them between the links and the ground, thus preventing the weeds from working up on the standard and being pushed or pulled around the standard so as to be out of the way. Practice has demonstrated that in big weeds it is necessary to force the rod deep into the ground, so that with the weeder constructed as disclosed in the patent aforesaid, when working in big weeds, the hitch links were working very close to the ground and the small space between the surface of the ground and the hitchlinks was found to be insufficient to allow big weeds through without catching.

Our present invention therefore has for its primary object to avoid the objections above noted and so improve the Wolfe weeder as to eliminate the clogging of the weeds in the manner referred to.

In its general nature, the present invention provides for the location of the hitch bar behind the main beam and forming with the main beam a frame to which a lifting lever is rigidly secured. The tiller frame bars are brought under the hitch bar-main-beam-frame in the preferable embodiment of the invention and hinged adjacent to the front edge of the main beam; projecting from the hitch bar and connected to the main beam are two members used to hitch the team or tractor to the machine. These members together with the hitch bar and main beam and suitable braces, make a rigid frame and braces are provided from the hitch bar to the rod bearing shoes at the back of the standards, thus imparting considerable strength to the machine for purposes hereinafter made clear.

The invention also has for its object to provide means whereby the hitch is so balanced that the tilting lever does not need to be fastened down but will just stay down without fastening yet when the rod or shoe strikes a rock, the resistance caused by the obstruction will be sufficient to lift the lever until the obstruction is passed and then the rod and lever assume their proper places, the balancing of the hitch with relation to the resistance encountered by the upward motion of the rotatable rod being such that the lifting lever may be operated with the minimum effort.

Another object of the invention is to provide means whereby the depth of penetration of the rotary rod may be regulated to a nicety in any kind of soil and in the preferable embodiment of our invention this is accomplished by the provision of a wheel in addition to the traction wheel that drives the rotary rod, the additional wheel and the traction wheel having provision for being adjustably and fixedly located with relation to the main beam so that the rod will be held at a definite distance below the surface of the ground.

Another object of the invention is the elimination of the shoes or skids used in forming a fulcrum when tilting the former patented structure and to place the function of the skids in the additional wheel and in the traction wheel, thus effecting a quicker and more efficient operation in raising the rotary rod out of the ground.

In its more subordinate nature, the invention also includes those novel details of construction, combination and arrangement of parts, all of which will be first fully described, then be specifically pointed out in the appended claims and illustrated in the accompanying drawings which illustrate a preferred embodiment of the invention and in which:

Figure 1 is a perspective view showing our invention with the parts in the position to withdraw the rod from the ground, the rod having been lifted from the ground.

Fig. 2 is a perspective view of the machine with the parts in the position they assume when the rotary rod is embedded in the ground.

Fig. 3 is a top plan view of the machine.

Fig. 4 is a vertical longitudinal section of the same.

Fig. 5 is a diagrammatic view illustrating the position of the parts with the rod at normal penetration and under normal operation.

Fig. 6 is a similar diagrammatic view showing the operation of the parts when the rotary rod or one of its standards engages a fixed obstruction such as a rock, tree stump or the like.

Fig. 7 is a detail enlarged section showing the lever lifted and the rod raised out of the ground.

Fig. 8 is a detail view of the second wheel adjusting bracket.

Fig. 9 is a perspective view of a modification of the invention hereinafter referred to.

Fig. 10 is a detail vertical longitudinal section on the line 10—10 of Fig. 3.

In the drawings, in which like numerals of reference indicate like parts in all of the figures, 1 represents the main beam from which the standards 4 project, the standards 4 having the usual bearing shoes 5 for the rotatable rod 6 which is driven by the traction wheel 7 through the usual transmission shaft 8, as has heretofore been the practice. The traction wheel 7 is carried by the hinged frame 9 which forms an end extension of the beam 1 and is adjustably held by pins 11 passing through holes in the beam 1 and the bars of the frame 9 so as to locate the wheel 7 in a position to effect a greater or lesser penetration of the rod beneath the surface of the ground (while we have indicated pins 11 for performing this function, it is obvious that other well known means may be provided for the purpose, if desired.)

12 is the lifting lever which is secured rigidly to the beam 1 and to the hitch bar 13 which lies to the rear of the beam 1 and is connected with such beam by the longitudinal bars 16 which lie under the beam 1 and under the hitch bar 13. The beam 1 and hitch bar 13 are also connected by longitudinal braces 14 and diagonal braces 15 so that the parts 1, 13, 14, 15 and 16 constitute a rigid frame.

2 is the tiller frame which carries the tiller wheel 3, the tiller frame 2 consisting of bars diverging from the wheel 3 forwardly and hingedly secured at 23 to the front of the beam 1, the bars of the tiller frame preferably lying under the hitch bar 13 and the beam 1.

The longitudinal draft bars 16 are provided with clevis plates 19 to which the traction engine or team may be hitched in the usual way; the clevis plates 19 being braced by braces 17—18 so as to form a rigid structure.

20 is the additional wheel, which is mounted on an adjustable bracket 21 secured to the beam 1 at the end opposite to that to which the traction wheel 7 is connected. By adjusting the positon of the wheel 20 on its bracket 21 and by adjusting the position of the wheel 7 through the medium of the pins 11 the depth of penetration of the rod 6 can be regulated to a nicety.

In order to transmit the draft thrust to the standards 4 at their lower ends and to brace the said standards rearwardly extending diagonal braces 22 are provided which are connected at 25 to the bearing shoes 5 and at 26 to a fixture on the hitch bar 13. Thus, it will be seen that by the present construction the line of draft lies horizontally close to the hinge axis 23 but slightly below the same, the draft thrust being transmitted downwardly and forwardly through the diagonal braces 22 to the lower ends of the standards 4. As the lever 12 lies slightly above the axis of the hinge 23 and as the line of draft is slightly below the axis of the hinge 23, the draft pull on the vehicle tends to hold the lever 12 down against the cross bar 24 of the tiller frame. The resistance of the motion of the rod through the ground, however, tends to raise the lever 12. By locating the line of draft close to the horizontal plane containing the pivotal axis 23 and at a proper distance therefrom the downward pull on the lever 12, due to the force acting along the line of draft, may be very nearly counter-balanced by the resisting forces encountered by the rotary rod in passing through the soil. Thus, when it is desired to raise the rod out of the ground a very slight upward lift on the end of the lever 12 will be sufficient to overcome the balance and enable the rod to be raised out of the ground. Likewise an unusual resistance to the onward motion of the rod as, for example, when the rod encounters a fixed obstruction, will be sufficient to overcome the balance thus causing lever 12 to be elevated as shown in the diagrammatic figure, Fig. 6 of the drawing.

From the foregoing, it will be seen that by placing the hitch bar behind the main beam and bracing it to the main beam to form part of a frame and by providing the draft bars 16 as a part of that frame a rigid frame structure is provided and the machine greatly strengthened. The diagonal braces 22 in connection with this rigid frame are such that if the bearing shoe strikes a rock, it has a strong brace pushing from behind it and breakage from this cause will be reduced to the minimum. Practice has demonstrated that by using the same size materials as are used in the previously patented weeder, with one or two minor exceptions, a machine is provided by our present construction that will work in rocks or anything and be strong enough to hang up a six horse team without breaking anything.

It will also be observed that by our construction, it is unnecessary to lift the tiller frame from the ground under any conditions. When the machine strikes a rock or other impassable obstruction, the main frame tips allowing the rod to rise and pass over the obstruction (see Fig. 6). This is entirely automatic. The hitch is so balanced that the lever does not need to be fastened down but it will just stay down with no fastening. When the rod or a shoe strikes a rock, the resistance caused by the obstruction is sufficient to lift the lever until the obstruction is passed and then the rod and lever will resume their proper places.

The hitch is so evenly balanced that in normal conditions a small child can raise or lower the lever. Any heavy obstruction will be sufficient to push the rod backward and upward so that the machine will glide over the obstruction. We also wish to call attention to the fact that this balanced hitch is used without springs or other resilient devices, which is due to the special design of the machine as a whole. In hard ground the hitch may be connected to the clevis plate higher or lower, as required, to force the rod to its proper depth and this may also be facilitated by placing weights on the machine, if necessary. However arranged, the balance would be maintained and the great value of the machine for working in roots or rocks is secured.

We also desire to call attention to the fact that by our arrangement of hitch the same leaves the whole length of the iron standards without braces in front or anything else to catch the weeds and clogging the machine. The whole front of the iron standard is free and even large weeds or bunches of straw or stubble will come against the iron standards and will work up and around and away without clogging or impeding the work in any way.

Attention is further directed to the fact that another feature of this invention lies in the fact that the depth can be regulated to a nicety in any kind of soil, thus making the machine pull lighter and doing better work under certain conditions.

By providing the additional wheel 20, we find that the use of the skids or runner bars (20 in the drawings of Patent #1,232,149) may be entirely eliminated, and as the wheels 20 and 7 remain in contact with the ground while the rod is working it will be seen that the point of fulcrum on which the rod is raised is constantly ready to function, thus as soon as the operator begins to lift the lever 12 the rod begins to come out of the ground, thereby eliminating lost motion in the part lifted.

As best shown in Figs. 1, 3 and 10, a bracket 27 is fastened to the rear side of the drive frame or head 9, a vertical piece of steel 28 forming the face of the bracket. The vertical member 28 is flat so that it may press against a roller 29 fastened to the front side of the hitch bar or rear beam of the frame. This arrangement allows the drive head to play up or down, according to the condition of the ground over which it goes, (the pin 11, of course, being removed) and yet it cannot get out of position so as to bind on the main beam. By shimming up the roller bracket 29 the necessary adjustment can be made so as to keep the head 9 free of binding contact with the end of the beam to which it is pivoted according to the need of the situation.

It will, of course, also be understood that the extra wheel 20 may be omitted and the lever 12 may be permanently fastened to the tiller frame at its rear end or the lever 12 may be entirely omitted and the tiller frame secured directly to the main beam 1 and the hitch bar 13, as shown in Fig. 9. While the form shown in Figs. 1 to 8, inclusive, is the preferred form, we desire, however, to have it understood that our invention is not limited to this particular construction but includes as well such a structure, for example, as is shown in Fig. 9. The structure shown in Fig. 9 while not possessing all of the efficiency of the structure shown in the preceding figures is, nevertheless, a practical machine. When the structure shown in Fig. 9 is employed, the balance can still be maintained by changing the position of the draft connection of the clevis so that the line of draft will be at such distance from the rotary rod as to counteract the weight of the tiller frame and the driver, it being, of course, understood that in this form in order to lift the rotary rod out of the ground the driver gets off the tiller frame and lifts it, as in the Wolfe patent hereinbefore referred to. Other changes in the details of construction and arrangement of parts may be readily made without departing from the spirit of the invention and the scope of the appended claims.

From the foregoing description taken in connection with the accompanying drawings it is thought the complete construction, operation and advantages of the invention will be clear to those skilled in the art.

What we claim is:—

1. In rotary rod weeders, a main beam, bearing standards carried thereby, a hitch bar at the rear of said beam, means securing said hitch bar and beam together, draft bars extending forwardly of the main beam in a plane close to that containing the beam and hitch bar, a tiller frame hinged to said beam, a lever for rocking the beam, a rotary rod, driving mechanism for the rod including a traction wheel adjustably carried by the main beam, and means forming a fulcrum for said lever.

2. In rotary rod weeders, a main beam, bearing standards carried thereby, a hitch bar at the rear of said beam, means securing said hitch bear and beam together, draft bars extending forwardly of the main beam in a plane close to that containing the beam and hitch bar, a tiller frame hinged to said beam, a lever for rocking the beam, a rotary rod, driving mechanism for the rod including a traction wheel adjustably carried by the main beam, means for forming a fulcrum for said lever, and braces connecting the lower ends of said bearing standards with the hitch bar.

3. In rotary rod weeders, a main beam, bearing standards carried thereby, a hitch bar at the rear of said beam, means securing said hitch bar and beam together, draft bars extending forwardly of the main beam in a plane close to that containing the beam and hitch bar, a tiller frame hinged to said beam, a lever for rocking the beam, a rotary rod, driving mechanism for the rod including a traction wheel adjustably carried by the main beam, and means for adjusting the depth of penetration of the rod in the ground.

4. In rotary rod weeders, a main beam, bearing standards carried thereby, a hitch bar at the rear of said beam, means securing said hitch bar and beam together, draft bears extending forwardly of the main beam in a plane close to that containing the beam and hitch bar, a tiller frame hinged to said beam, a lever for rocking the beam, a rotary rod, driving mechanism for the rod including a traction wheel adjustably carried by the main beam, and a second wheel adjustably carried by the beam to coöperate with the traction wheel for adjusting the penetration of the rod in the ground and also to form a fulcrum for said lever.

5. In rotary rod weeders wherein is provided a main beam carrying the rod bearing standard in which the rotary rod is located, and carrying the rotary rod driving mechanism; a hitch bar secured to the main beam in the rear thereof, draft members connected to the hitch bar and projecting forwardly of the main beam, a lever secured to the main beam and a tiller frame hinged to the main beam substantially as shown and described.

6. In rotary rod weeders wherein is provided a main beam carrying the rod bearing standard in which the rotary rod is located, and carrying the rotary rod driving mechanism; a hitch bar secured to the main beam in the rear thereof, draft members connected to the hitch bar and projecting forwardly of the main beam, a lever secured to the main beam, and a tiller frame hinged to the main beam, the hinge axis of said tiller frame lying close to the line of draft.

7. In rotary rod weeders wherein is provided a main beam carrying the rod bearing standard in which the rotary rod is located, and carrying the rotary rod driving mechanism; a hitch bar secured to the main beam in the rear thereof, draft members connected to the hitch bar and projecting forwardly of the main beam, a lever secured to the main beam, and a tiller frame hinged to the main beam, the hinge axis lying at such distance from the line of draft that the force tending to hold the lever down will be substantially balanced by the normal force acting against the rotary rod in its travel through the ground which tends to raise the lever.

8. In rotary rod weeders wherein is provided a main beam carrying the rod bearing standards in the bearings of which the rotary rod is journaled and to which main beam the rotary rod driving mechanism is secured; of a tiller frame hingedly connected to the main beam, a lever for rocking the main beam on the hinge connection, means forming a fulcrum for said lever whereby as said lever is raised the rotary rod will be brought out of the ground, a hitch bar mounted at the rear of said beam, draft connections with the hitch bar extending forwardly of the beam in proximity to the same substantially as shown and described.

9. In rotary rod weeders wherein is provided a main beam carrying the rod bearing standards in the bearings of which the rotary rod is journaled and to which main beam the rotary rod driving mechanism is secured, of a tiller frame hingedly connected to the main beam, a lever for rocking the main beam on the hinge connection, means forming a fulcrum for said lever whereby as said lever is raised the rotary rod will be brought out of the ground, a hitch bar mounted at the rear of said beam, draft connections with the hitch bar extending forwardly of the beam in proximity to the same, all being arranged whereby the force acting along the line of draft is applied below the hinge connection to tend to hold said lever down against the tiller frame, substantially as shown and described.

10. In rotary rod weeders wherein is provided a main beam carrying the rod bearing standards in the bearings of which the rotary rod is journaled and to which main beam the rotary rod driving mechanism is secured; of a tiller frame hingedly connected to the main beam, a lever for rocking the main beam on the hinge connection, means forming a fulcrum for said lever whereby as said lever is raised the rotary rod will be brought out of the ground, a hitch bar mounted at the rear of said beam, draft connections with the hitch bar extending forwardly of the beam in close proximity to the same, all being arranged whereby the force acting along the line of draft is applied below the hinge connection to tend to hold said lever down against the tiller frame with a force but slightly in excess of the resistant forces encountered by the travel of the rotary rod which tends to raise the lever thereby providing a substantially counterbalanced lever.

11. In rotary rod weeders wherein is provided a main beam, rod carrying standards projected downwardly from the beam, a rotary rod mounted in bearings at the lower ends of said standards, and means for driving the rotary rod; a tiller frame hinged to said main frame beam, a lever secured to the main frame beam for rocking the beam on the hinge axis, means forming a fulcrum for said lever, a hitch bar carried by the beam at the rear of the same and draft bars secured to the hitch bar and beam whereby the line of draft will lie below the hinge axis substantially as shown and described.

12. In rotary rod weeders wherein is provided a main beam, rod carrying standards projected downwardly from the beam, a rotary rod mounted in bearings at the lower ends of said standards, and means for driving the rotary rod; a tiller frame hinged to said main beam, a lever secured to the main beam for rocking the beam on the hinge axis, means forming a fulcrum for said lever, a hitch bar carried by the beam at the rear of the same and draft bars secured to the hitch bar and beam whereby the line of draft will lie below the hinge axis and at such distance below the hinge axis as to exert a force of such magnitude which tends to hold said lever down as will be substantially counterbalanced by the resistant force against the travel of the rotary rod that tends to lift the lever up, substantially as shown and for the purposes described.

13. In rotary rod weeders wherein is provided a main beam for carrying the rod bearing standards in which the rotary rod is journaled and wherein is provided a tiller frame hinged to the beam and a lever secured to the beam and adapted to lie against the tiller frame and wherein is provided draft applying means; means forming a cooperative part of the draft applying means for substantially counterbalancing the force tending to move said lever while the machine is in operation.

14. In rotary rod weeders wherein is provided a main beam carrying the rod bearing standards in which the rotary rod is located, and carrying the rotary rod driving mechanism; a hitch bar secured to the main beam in the rear thereof, draft members connected to the hitch bar and projecting forwardly of the main beam, a tiller frame connected to the main beam and extending rearwardly of the hitch bar.

15. In rotary rod weeders wherein is provided a main beam carrying the rod bearing standards in which the rotary rod is located, and carrying the rotary rod driving mechanism; a hitch bar secured to the main beam in the rear thereof, draft members connected to the hitch bar and projecting forwardly of the main beam, a tiller frame connected to the main beam and extending rearwardly of the hitch bar, said draft members including longitudinal draft bars and clevis adjustably secured to said draft bars whereby the line of draft may be adjusted higher or lower to counterbalance those parts to the rear of the main beam which are fixed with respect to the main beam.

16. In rotary rod weeders wherein is provided a main beam carrying rod bearing standards in which the rotary rod is located, and carrying the rotary rod driving mechanism; a hitch bar secured to the main beam in the rear thereof and fixedly located with relation to the main beam; draft members connected to the hitch beam and extending longitudinally toward and projecting in front of the main beam, said draft members including adjustable elements whereby the line of draft may be raised and lowered with respect to the rotary rod to counterbalance those parts which project to the rear of and are secured to the main beam, and a lever secured to the main beam and extending rearwardly thereof.

17. In rotary rod weeders wherein is provided a main beam carrying the rod bearing standards in which the rotary rod is located and carrying the rotary rod driving mechanism; a hitch bar, draft members connected to the hitch bar and projecting forwardly of and secured to the main beam, a lever secured to the main beam and connected with the hitch bar, and a tiller frame hinged to the main beam and projecting rearwardly of the hitch bar.

LOUIS C. VAN PATTEN.
JOEL B. WOLFE.